(12) United States Patent
Salter et al.

(10) Patent No.: US 11,084,427 B2
(45) Date of Patent: Aug. 10, 2021

(54) RUNNING BOARD ASSEMBLY AND METHOD PERMITTING OVERCURRENT

(71) Applicant: Ford Global Technologies, LLC, Dearborn, MI (US)

(72) Inventors: Stuart C. Salter, White Lake, MI (US); Chris Thomas Bustamante, Dearborn Heights, MI (US); Aaron Halonen, Brighton, MI (US); David Brian Glickman, Southfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 346 days.

(21) Appl. No.: 16/180,354

(22) Filed: Nov. 5, 2018

(65) Prior Publication Data
US 2020/0139891 A1    May 7, 2020

(51) Int. Cl.
| | | |
|---|---|---|
| *B60R 3/02* | (2006.01) | |
| *H02P 29/40* | (2016.01) | |
| *B60Q 9/00* | (2006.01) | |
| *B60R 3/00* | (2006.01) | |
| *B60R 16/027* | (2006.01) | |
| *B60R 16/03* | (2006.01) | |

(52) U.S. Cl.
CPC .............. *B60R 3/02* (2013.01); *B60Q 9/00* (2013.01); *B60R 3/002* (2013.01); *B60R 16/027* (2013.01); *B60R 16/03* (2013.01); *H02P 29/40* (2016.02)

(58) Field of Classification Search
CPC ......... B60R 3/02; B60R 3/002; B60R 16/027; B60R 16/03; H02P 29/40; B60Q 9/00
See application file for complete search history.

(56) References Cited

U.S. PATENT DOCUMENTS

| | | | |
|---|---|---|---|
| 6,178,364 B1* | 1/2001 | Delurey | B60R 3/02 |
| | | | 105/443 |
| 6,325,397 B1 | 12/2001 | Pascoe et al. | |
| 6,794,837 B1* | 9/2004 | Whinnery | H02H 7/0851 |
| | | | 318/266 |
| 6,830,257 B2 | 12/2004 | Leitner | |
| 8,720,924 B2 | 5/2014 | Ruehl | |

(Continued)

FOREIGN PATENT DOCUMENTS

WO    2010072585 A1    7/2010

OTHER PUBLICATIONS

"2011+ F150 Power Deployable Running Boards RESET," downloaded from https://5startuning.com/wp-content/uploads/PowerRunningBoardReset.pdf, Printed for 2011 Model Year.

(Continued)

*Primary Examiner* — Jess Whittington
*Assistant Examiner* — Brian E Yang
(74) *Attorney, Agent, or Firm* — David Coppiellie; Carlson, Gaskey & Olds, P.C.

(57) ABSTRACT

This disclosure relates to a running board assembly for a motor vehicle and a corresponding method. An example method includes supplying current to a motor to move a running board between a retracted position and a deployed position, monitoring a level of the current, and permitting the level of current to exceed a threshold (i.e., overcurrent is permitted) in response to a user input.

16 Claims, 8 Drawing Sheets

(56) References Cited

U.S. PATENT DOCUMENTS 9,527,449 B2 12/2016 Smith
2019/0265725 A1* 8/2019 Shao .................... G05D 1/0088

OTHER PUBLICATIONS

Ford, Power Running Boards, "Using Power Running Boards," 2014 F-150 Owner's Manual, downloaded from http://www.fordservicecontent.com/Ford_Content/vdirsnet/OwnerManual/Home/Content?bookCode=O23854&languageCode=en&marketCode=US&viewTech=IE&chapterTitleSelected=G1611745&subTitleSelected=G1611745&topicHRef=G1611747&div=f, Sep. 14, 2018. Printed for 2014 Model Year.

* cited by examiner

RUNNING BOARD ASSEMBLY AND METHOD PERMITTING OVERCURRENT

TECHNICAL FIELD

This disclosure relates to a running board assembly for a motor vehicle and a corresponding method.

BACKGROUND

Sport utility vehicles (SUVs), trucks, pickup trucks, vans, and other vehicles, such as four wheel drive (4WD) vehicles, have a relatively high ground clearance, meaning the floor is at a relatively high elevation above the ground.

Running boards are known. Some running boards are fixed and held stationary relative to a vehicle body, while other running boards are retractable, meaning they are selectively moveable between a retracted position (sometimes referred to as a "stowed" position) and a deployed position. The latter type of running board may be referred to as a powered running board.

SUMMARY

A method according to an exemplary aspect of the present disclosure includes, among other things, supplying current to a motor to move a running board of a motor vehicle between a retracted position and a deployed position, monitoring a level of the current, and permitting the level of current to exceed a threshold in response to a user input.

In a further non-limiting embodiment of the foregoing method, the method includes issuing a prompt to a user when the level of current comes within a predetermined range of the threshold.

In a further non-limiting embodiment of any of the foregoing methods, the prompt asks the user to determine whether an area adjacent the running board is free of obstructions, and the user is permitted to provide an input indicating whether the area is free of obstructions in response to the prompt.

In a further non-limiting embodiment of any of the foregoing methods, the permitting step includes permitting the level of current to exceed the threshold by a predetermined amount in response to the user input.

In a further non-limiting embodiment of any of the foregoing methods, the permitting step includes permitting the level of current to exceed the threshold for a predetermined number of cycles in response to the user input.

In a further non-limiting embodiment of any of the foregoing methods, the threshold includes a static current threshold and a moving current threshold.

In a further non-limiting embodiment of any of the foregoing methods, the static current threshold is greater than the moving current threshold.

In a further non-limiting embodiment of any of the foregoing methods, the threshold is different depending on whether the running board is being retracted or deployed.

In a further non-limiting embodiment of any of the foregoing methods, the threshold is lower when the running board is moving to the deployed position than when the running board is moving to the retracted position.

In a further non-limiting embodiment of any of the foregoing methods, the threshold is determined based on at least an ambient temperature.

In a further non-limiting embodiment of any of the foregoing methods, the method further includes moving the running board between the retracted and deployed positions a series of times when the ambient temperature is below a predetermined temperature and when the level of current is at least within a predetermined range of the threshold.

In a further non-limiting embodiment of any of the foregoing methods, the method includes tracking a trend of the level of current over time, and issuing a prompt to a user when the trend approaches the threshold.

In a further non-limiting embodiment of any of the foregoing methods, the method includes moving the running board to the retracted position when the trend approaches the predetermined range and when it is determined the motor vehicle is being cleaned.

A running board assembly for a motor vehicle according to an exemplary aspect of the present disclosure includes, among other things, a controller, a motor responsive to instructions from the controller, and a running board moveable between a retracted position and a deployed position by the motor. Further, the controller is configured to permit a level of current drawn by the motor to exceed a threshold in response to a user input.

In a further non-limiting embodiment of the foregoing running board assembly, the controller is configured to permit the level of current to exceed the threshold by a predetermined amount in response to the user input.

In a further non-limiting embodiment of any of the foregoing running board assemblies, the controller is configured to permit the level of current to exceed the threshold for a predetermined number of cycles in response to the user input.

In a further non-limiting embodiment of any of the foregoing running board assemblies, the assembly includes a human-machine interface electrically connected to the controller, and the controller is configured to issue a prompt to a prompt to a user via the human-machine interface when the level of current comes within a predetermined range of the threshold. Further, the prompt asks the user to determine whether an area adjacent the running board is free of obstructions, and the user is permitted to provide an input indicating whether the area is free of obstructions in response to the prompt.

In a further non-limiting embodiment of any of the foregoing running board assemblies, the threshold includes a static current threshold and a moving current threshold, and the static current threshold is greater than the moving current threshold.

In a further non-limiting embodiment of any of the foregoing running board assemblies, the threshold varies based on at least one of (1) whether the running board is being retracted or deployed, and (2) an ambient temperature.

In a further non-limiting embodiment of any of the foregoing running board assemblies, the controller is configured to instruct the motor to move the running board between the retracted and deployed positions a series of times when an ambient temperature is below a predetermined temperature and when the level of current is at least within a predetermined range of the threshold.

DETAILED DESCRIPTION

This disclosure relates to a running board assembly for a motor vehicle and a corresponding method. An example method includes supplying current to a motor to move a running board between a retracted position and a deployed position, monitoring a level of the current, and permitting the level of current to exceed a threshold (i.e., overcurrent is permitted) in response to a user input. The user input may be in response to a prompt which asks the user to indicate that there are no obstructions in the way of the running board's expected path of movement. On the one hand, permitting overcurrent prolongs the useful life of the running board assembly and makes the running board assembly adaptable to changing weather conditions, while on the other hand prompting the user before drawing overcurrent increases safety, and may specifically prevent the running board from interfering with an obstruction, such as a rock or a person's limb or appendage, which could damage the running board or cause injury. These and other benefits will be appreciated from the below description.

Figure 1:
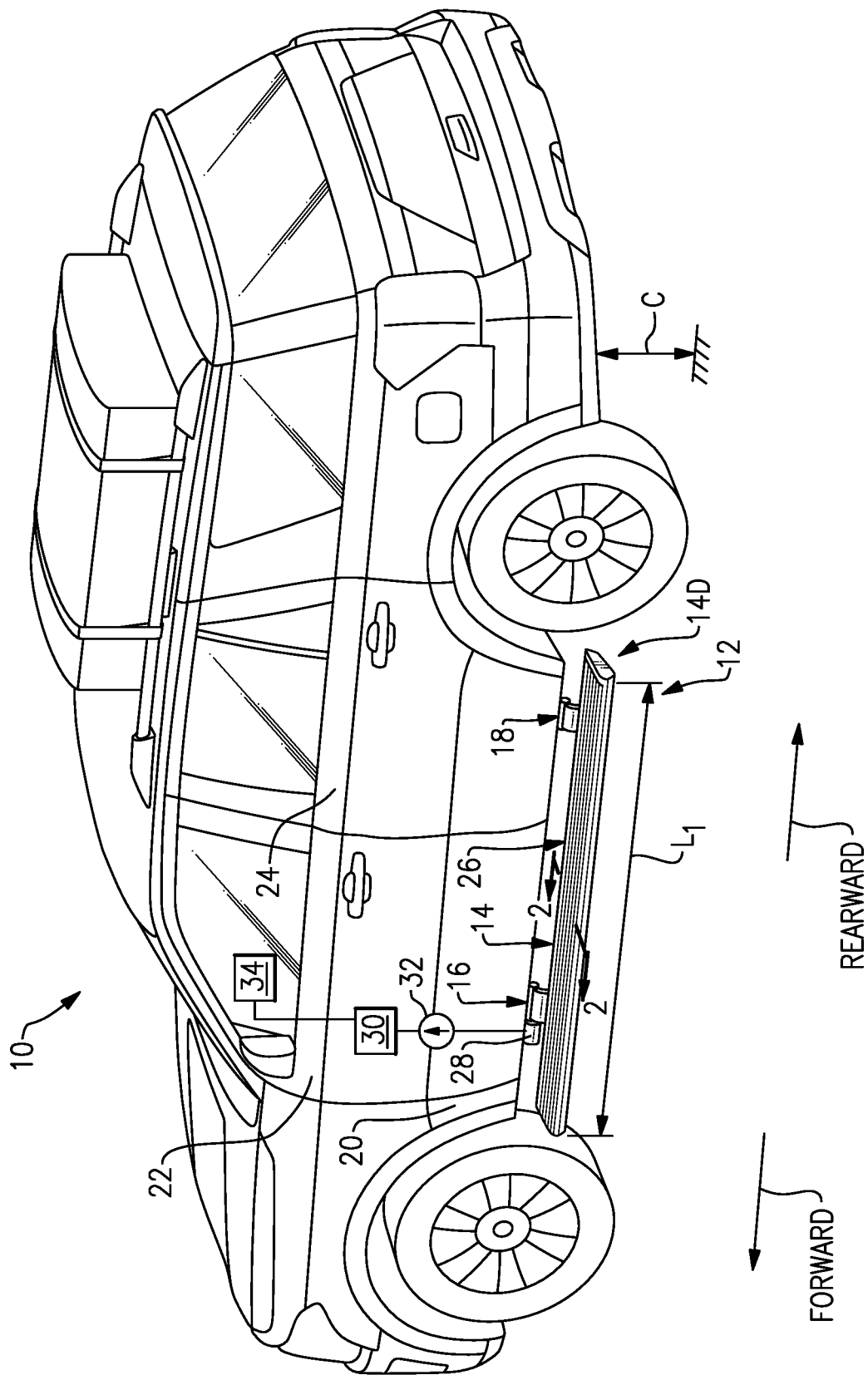
FIG. 1 is a perspective view of a motor vehicle with an example running board assembly.

Referring to the drawings, FIG. 1 is a rear-perspective view of a motor vehicle 10. The vehicle 10 has a relatively high clearance C, which is a distance between a ground surface and a floor of the vehicle 10. As shown, the vehicle 10 is a sport utility vehicle (SUV). While an SUV is pictured, this disclosure is also applicable to other types of vehicles having a high ground clearance, such as vans and trucks (including pickup trucks).

Figure 2:
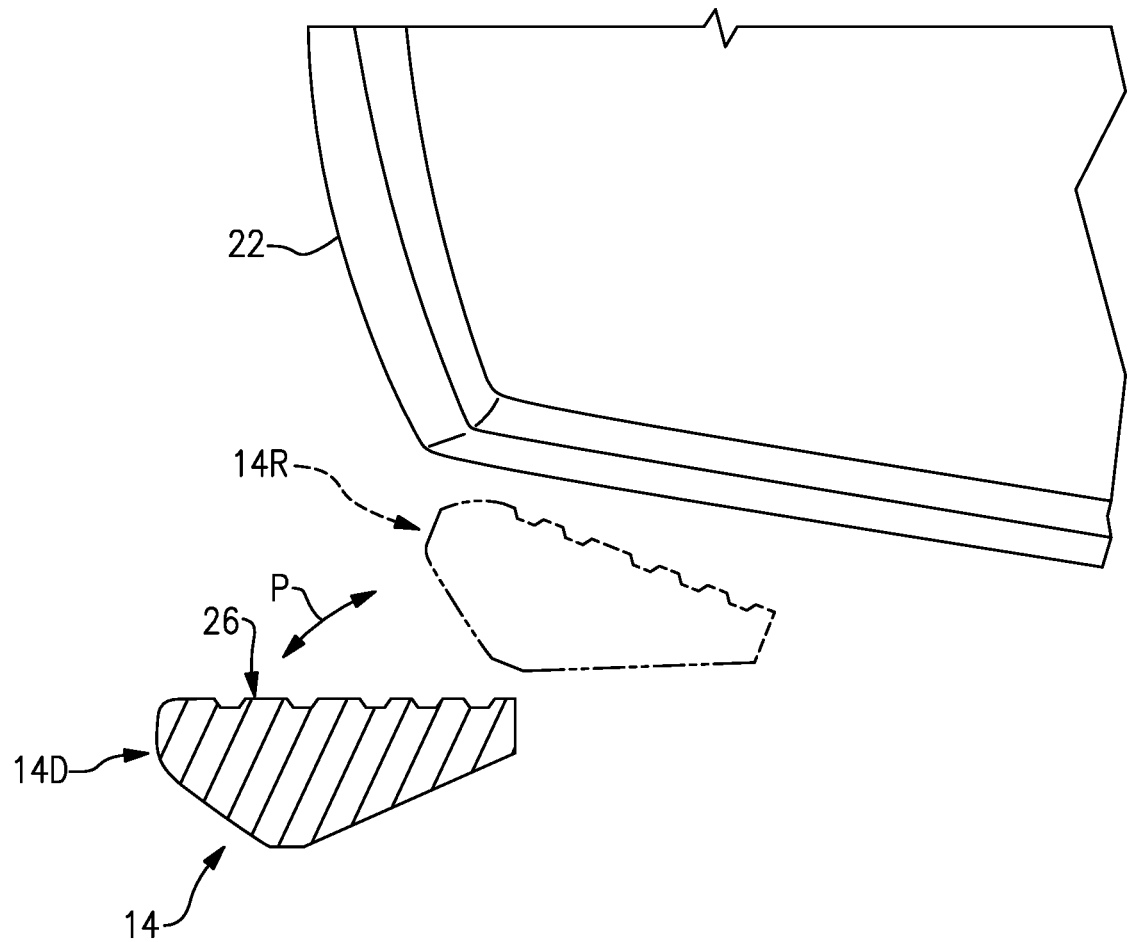
FIG. 2 is a cross-sectional view taken along line 2-2 and illustrates the example running board in a deployed position and, in phantom, a retracted position.

The vehicle 10 includes a running board assembly 12. In this example, the running board assembly 12 is a retractable running board assembly (or, a powered running board assembly), which is moveable between a retracted position 14R (FIG. 2) and a deployed position 14D (FIG. 2). The running board assembly 12 is shown in the deployed position in FIG. 1. In this example, the retractable running board assembly 12 includes a running board 14 and first and second linkages 16, 18 rotatably connecting the running board 14 to a vehicle body 20, which includes the frame and paneling of the vehicle 10.

The running board 14 has a length Li that extends in a direction parallel to the "forward" and "rearward" directions, which are labeled in FIG. 1 and correspond to the normal "forward" and "rearward" orientations of the vehicle 10. The running board 14 in this example spans at least a majority of the widths of a front door 22 and a rear door 24 of the vehicle 10. While only one running board 14 is shown in FIG. 1, it should be understood that a similar running board may be provided on an opposite side of the vehicle 10.

When in the deployed position, a user may step on the running board 14 as they enter and exit the vehicle 10. Specifically, the user may step on a deck 26 (or, step pad or stepping platform) of the running board 14, which in this example provides the uppermost surface of the running board 14.

In this example, the first linkage 16 is directly coupled to a motor 28, which is configured to move the running board 14 between the retracted and deployed positions. In one example, the motor 28 is electrically connected to a controller 30 (i.e., a control unit), which instructs the motor 28 to move the running board 14 between the retracted and deployed positions based on whether the doors 22, 24 are opened or closed, for example. In a particular example, the motor 28 is electrically connected to the controller 30 via a current source 32, which is an electronic component and may be provided by a battery of the vehicle 10, and is configured to power the motor 28. The controller 30 is also configured to determine the level (i.e., amount) of current the motor 28 draws from the current source 32.

The controller 30 is shown schematically in FIG. 1. It should be understood that the controller 30 could be part of an overall vehicle control module, such as a vehicle system controller (VSC), or could alternatively be a stand-alone controller separate from the VSC. Further, the controller 30 may be programmed with executable instructions for interfacing with and operating the various components of the vehicle 10. The controller 30 additionally includes a processing unit and non-transitory memory for executing the various control strategies and modes of the vehicle system.

In one example, the motor 28 is an electric motor, and is responsive to instructions from the controller 30 to selectively to adjust a position of the first linkage 16. The second linkage 18 is configured to move in response to movement of the first linkage 16. In other words, the second linkage 18 is a follower linkage. In another example, however, the second linkage 18 could be directly coupled to the motor 28 and the first linkage 16 could be a follower linkage. Further, while two linkages 16, 18 are illustrated in FIG. 1, this disclosure extends to retractable running board assemblies having one or more linkages.

FIG. 2 is a somewhat schematic cross-sectional view of the running board 14 taken along line 2-2 and illustrates two example operational positions of the running board 14 relative to the door 22. The motor 28 and the linkages 16, 18 are configured to move the running board 14 along a path of movement P between a retracted position 14R (shown in phantom) and a deployed position 14D. In the retracted position 14R, the running board 14 is essentially tucked under a lower surface of the door 22 to protect the running board 14 while the vehicle 10 is in motion, for example.

While a two-position (i.e., retracted/stowed, and deployed positions) running board assembly is shown in the figures, it should be understood that this disclosure extends to retractable running board assemblies that are moveable to another number of positions (i.e., three or more positions).

Figure 3:
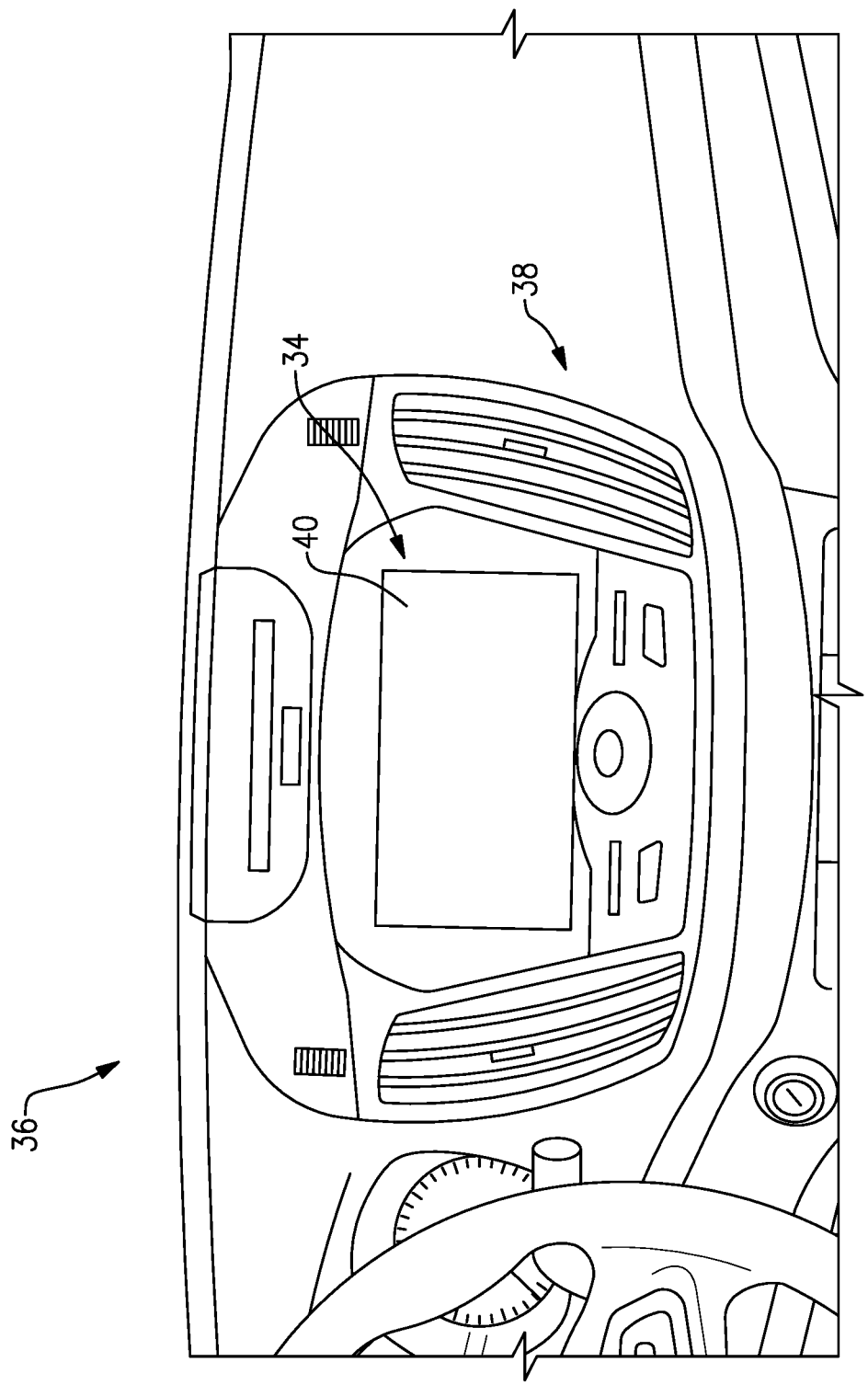
FIG. 3 illustrates an example vehicle cabin, and in particular illustrates an example human-machine interface.

With reference to FIGS. 1 and 3, the vehicle 10 also includes a human-machine interface 34. In one example, the human-machine interface 34 is provided in a vehicle cabin 36 (FIG. 3) and is accessible by a user from within the vehicle 10. The controller 30 is electrically connected to the human-machine interface 34. The inputs the user provides to the human-machine interface 34 are interpreted by the controller 30, which then executes various operations consistent with the inputs. One example human-machine interface 34 is provided, at least in part, by the SYNC® System offered commercially by Ford Motor Company.

FIG. 3 illustrates an example vehicle cabin 36 and, in particular, illustrates an in-vehicle infotainment (IVI) system 38. The in-vehicle infotainment system 38 includes the human-machine interface 34. The human-machine interface 34 includes a touchscreen 40 configured to display information, including prompts, to a user and to allow the user to provide inputs by touching the touchscreen 40. While a touchscreen 40 is shown and described herein, this disclosure is not limited to touchscreens, and extends to other types of human-machine interfaces. While the human-machine interface 34 is shown relative to a center console of the vehicle 10, the human-machine interface 34 may be located elsewhere in the vehicle 10, including the dashboard. In that example, the user may provide inputs via buttons on a steering wheel or in some other manner.

The running board assembly 12 will now be explained relative to a corresponding method 42 of this disclosure, which is represented by a flow chart across FIGS. 4A and 4B. In general, the running board assembly 12 and method 42 will permit the motor 28 to draw an overcurrent under certain conditions. For instance, when the running board assembly 12 becomes dirty and/or the lubrication associated with the running board assembly 12 deteriorates, as examples, more current may be required to effect movement of the running board 14 between the retracted and deployed positions. In the present disclosure, when the current drawn by the motor 28 approaches a threshold, the controller 30 issues a prompt to the user (i.e., via the human-machine interface 34), which asks the user to indicate that it is safe to draw overcurrent. If the user provides an input indicating that it is indeed safe (i.e., no obstructions are present), the motor 28 will draw overcurrent, thereby permitting movement of the running board 14 despite less than ideal conditions of the running board (i.e., the running board is dirty or lubrication is needed). Prompting the user before drawing overcurrent permits prolonged running board operation while increasing safety, and may specifically prevent the running board from closing on a hard object, such as a rock, or from pinching a user's limb or appendage, as examples.

Figure 4A:
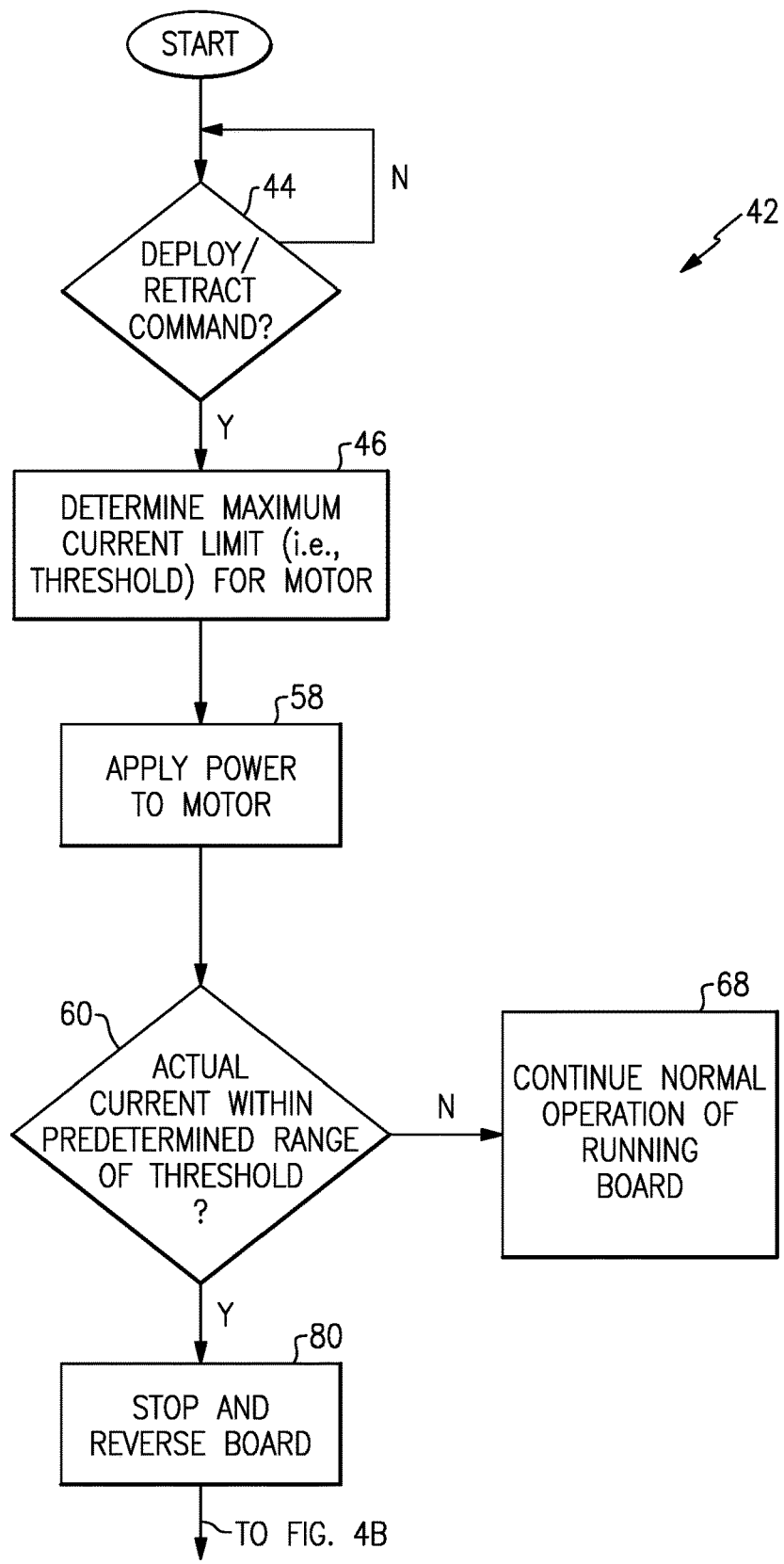
FIG. 4A illustrates a first portion of a flow chart representative of an example method according to this disclosure.
Figure 4B:
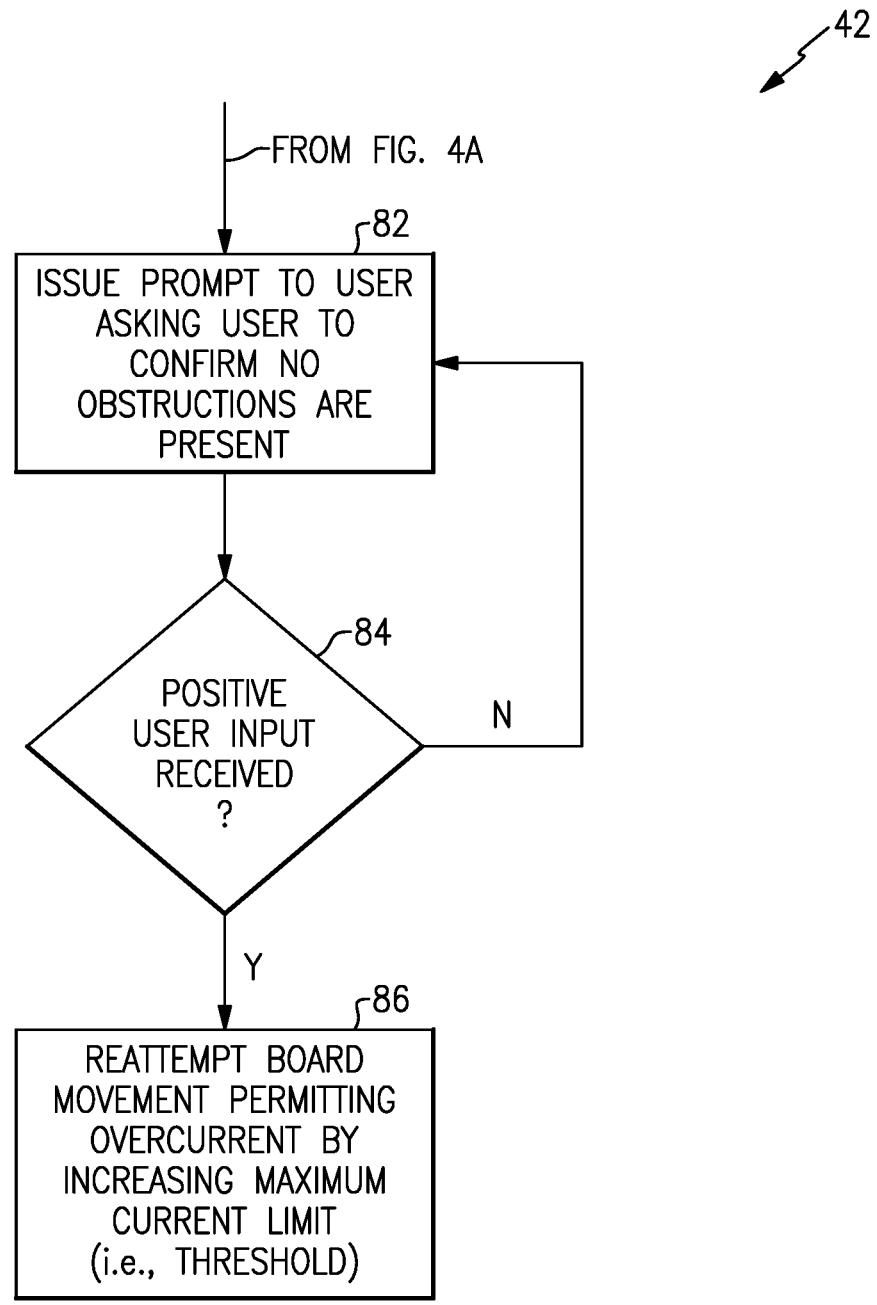
FIG. 4B illustrates a second portion of the flow chart.

With reference to FIGS. 4A and 4B, the method 42 begins when the controller 30 issues a command to deploy or retract the running board 14, at 44. As mentioned above, the controller 30 may be programmed to automatically issue such commands under certain conditions. For instance, when the vehicle 10 stops and one of the doors 22, 24 opens, the controller 30 may issue a command to deploy the running board 14. Alternatively, when the vehicle 10 is turned on and the doors 22, 24 are closed, the controller 30 may issue a command to retract the running board 14.

When a command is issued, at 44, the controller 30 determines a threshold level of current for the motor 28, at 46. The threshold level of current, in this example, is a maximum current limit of the motor 28, which ideally would not be exceeded under normal operating conditions. The threshold level of current may be determined by a number of factors, including ambient outside temperature and the particular command from the controller 30 (i.e., whether the command is a "retract" command or a "deploy" command). In particular, the motor 28 may require additional current when moving the running board 14 during cold weather conditions. In one example of this disclosure, the controller 30 adjusts the threshold level of current when the outside ambient temperature drops below a predetermined temperature, such as about 35° F. (about 1.67° C.). Further, the motor 28 may require less current when deploying the running board 14, because the running board 14 tends to naturally fall to the deployed position 14D under the force of gravity, whereas when moving to the retracted position 14R the running board 14 is generally against gravity. Thus, the threshold may be lower when the running board 14 is moving to the deployed position than when the running board 14 is moving to the retracted position. These factors are exemplary only. The controller 30 is configured to determine the threshold level of current based on these factors and/or others, and in one example may use a lookup table or the like to determine the threshold level of current.

Figure 5:
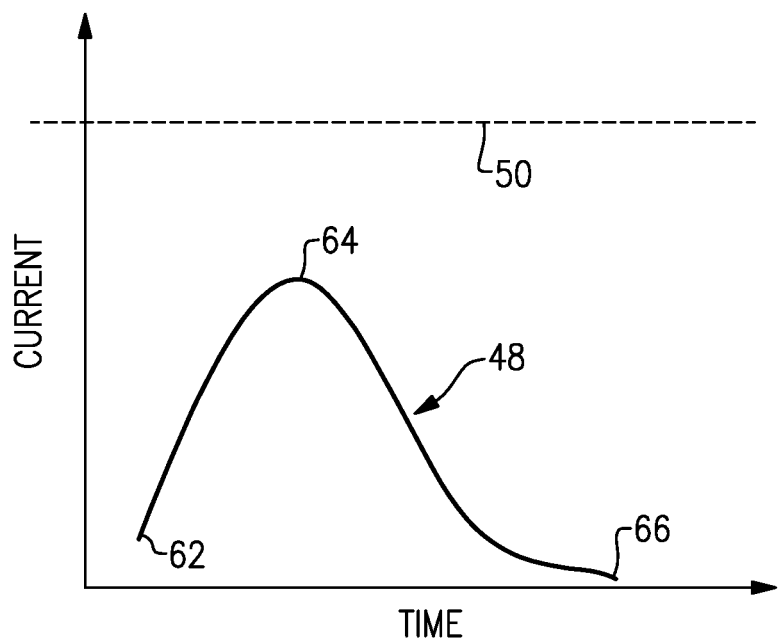
FIG. 5 is a first plot of current versus time, and further illustrates a constant threshold level of current.

FIG. 5 is an example plot of current versus time, and the line 48 is representative of the current drawn by the motor 28 during a normal movement of the running board 14 between the retracted position 14R and the deployed position 14D. The plot of FIG. 5 will be described in more detail below. FIG. 5 includes a dashed line 50, which in this example is indicative of the threshold level of current determined in step 46. In this example, the threshold level of current is a constant value. In one particular example, the threshold level of current is 30 Amps. As shown in FIG. 5, the current drawn by the motor 28 in this example stayed well below the threshold level, and thus the operation completed normally, as expected, and without the motor 28 overdrawing current.

Figure 6:
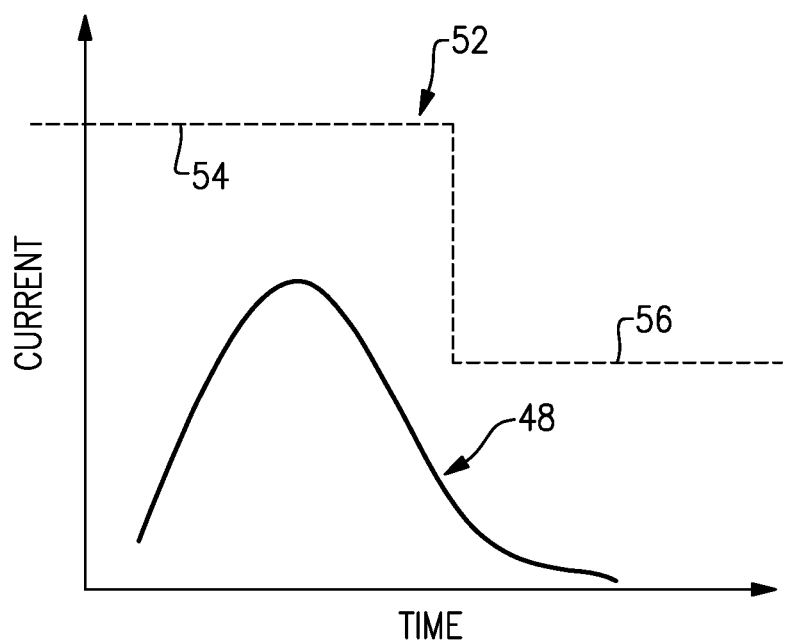
FIG. 6 is a second plot of current versus time, and further illustrates a variable threshold level of current.

While in FIG. 5 the threshold level of current was a constant value, in a further aspect of this disclosure the threshold level of current is not a constant level throughout the entire expected movement of the running board 14. Rather, the threshold level of current determined at step 46 may be variable. In one example, which is shown in FIG. 6, the threshold level of current is represented by line 52, and may include a static current threshold, represented by line segment 54, which is the current needed to initiate movement of the running board 14, and a moving current threshold, represented by line segment 56, which is the current needed to keep running board 14 moving. The moving current threshold is less than the static current threshold, because it ordinarily requires additional current to initiate movement of the running board 14. The threshold level of current is represented by a stepped line, in this example, but in other examples the threshold level of current can be variable without being stepped. In other words, the threshold level of current could move gradually relative to time.

In the example of FIG. 6, the current drawn by the motor 28 (as represented by line 48) stays well below the threshold level of current, and specifically stays well below both the static and moving current thresholds. Thus, the operation completed normally, as expected, and without overdrawing current.

Turning back to FIG. 4A, with the command from step 44 and the threshold level of current determined in step 46, power is applied to the motor 28, at 58. Specifically, the controller 30 may command the current source 32 to power the motor 28 such that the motor 28 effects the command by rotating in a particular direction. During step 58, the level of current drawn by the motor 28 is continually monitored by the controller 30, at 60. Specifically, at step 60, the controller 30 determines whether the current drawn by the motor 28 is approaching the threshold. Two examples will now be described for purposes of explanation.

With reference again to FIG. 5, line 48 is representative of the level of current drawn by the motor 28 during an operation wherein the running board 14 is moved between the deployed position and the retracted position. End point 62 of line 48 is representative of a condition where the running board 14 is in the deployed position 14D, and where current is initially being supplied to the motor 28. Between end point 62 and point 64, the latter of which is the turning point and local maximum of line 48, the current drawn by the motor 28 is continually increased. By the time the current reaches point 64, the running board 14 has begun moving from the deployed position. Once the running board 14 begins movement, the level of current continually decreases from point 64 to end point 66, where the running board 14 stops and has reached the retracted position 14R.

In the example of FIG. 5, there current drawn by the motor 28 never came within a predetermined range, which will be discussed below, of the threshold represented by line 50. Accordingly, with reference to FIG. 4A, the answer to the question in block 60 is no (or "N"), and thus normal operation continued, at 68.

Figure 7:
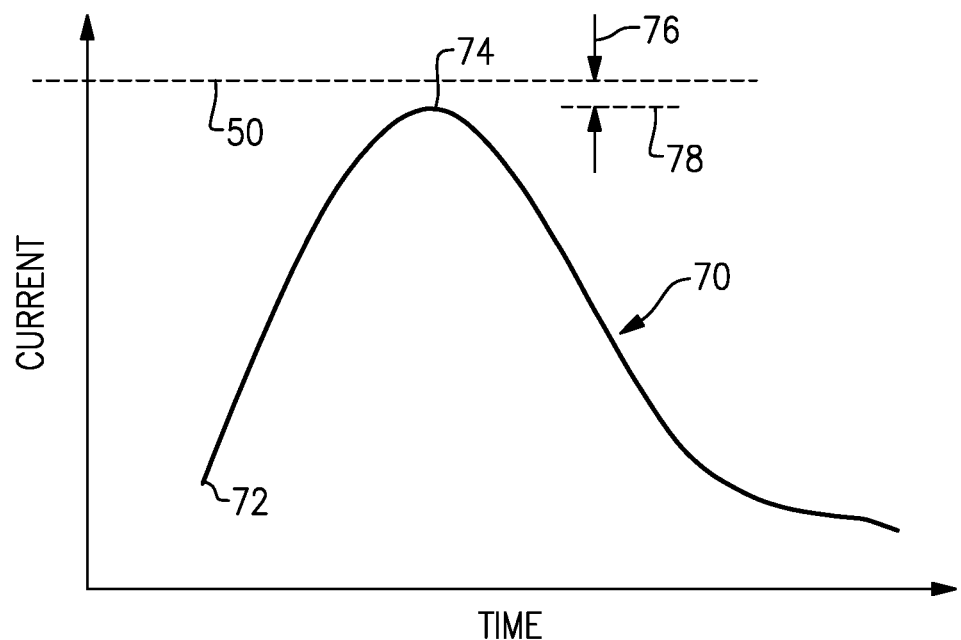
FIG. 7 is a third plot of current versus time, and in particular illustrates a level of current within a predetermined range of the threshold.

FIG. 7 is another example plot of current versus time and includes a line 70 representative of a level of current drawn by the motor 28 during another example operation. In FIG. 7, the threshold level of current represented by line 50 is the same as that in FIG. 5. In the example of FIG. 7, between end point 72, when the motor 28 begins drawing current, and point 74, which is the turning point and local maximum of line 70, the current level comes within a predetermined range, represented by space 76, of the threshold represented by line 50. The lower end of the predetermined range is represented by line 78. In one example the lower end is 10% of the threshold level. For instance, when the threshold is 30 Amps, the predetermined range is 3 Amps, and the lower end is 27 Amps. Again, these are examples only. The threshold and predetermined range may be other values.

In FIG. 7, the current drawn by the motor 28 has come within the predetermined range of the threshold, but has not exceeded the threshold. Specifically, point 74 of line 70 is between line 78 (lower end) and line 50 (threshold). This may be indicative of a condition where the lubrication associated with the running board assembly 12 has begun to deteriorate over time, or a condition where snow and ice have accumulated on the running board 14. Alternatively, it could also be representative of a condition wherein an obstruction, such as a rock or a person's appendage or limb is stuck between the running board 14 and the vehicle body 20 of the vehicle 10. Regardless, in the example of FIG. 7, the answer to block 60 is yes (or "Y"). In another example, the current may exceed the threshold, and in that example the answer to block 60 would also be yes because the current is greater than the threshold, and, in most cases, the current would also come within the predetermined range at some point after the time when the current source 32 began powering the motor 28.

In response to a condition such as that of FIG. 7, in the method 42 the running board 14 is stopped and reversed back to its previous position, at 80. In this way, the running board 14 will not continue to pinch an obstruction between the running board 14 and the vehicle body 20, for example. However, if no obstruction is present, in this disclosure continued operation is desirable despite the relatively high levels of current being drawn by the motor 28 because, for example, it is undesirable to have the running board 14 stuck in a deployed position during vehicle operation.

Thus, at 82, the controller 30 issues a prompt to a user via the human-machine interface 34 asking the user to determine whether an area adjacent the running board 14 is free of obstructions. The user may then check the relevant area, which may be the path of movement P or an area adjacent the linkages 16, 18, and respond as appropriate and/or clear the relevant area before responding. A positive input, in the affirmative (i.e., "yes" or "clear"), may be input using the touchscreen 40 or another input device such as a button on a steering wheel, for example.

If a positive input is received, at 84, the controller 30 permits the level of current to exceed the threshold by a predetermined amount, at 86. In particular, the controller 30 sets a temporarily increased threshold level of current, and reattempts movement of the running board 14 relative to the temporarily increased threshold level of current. As examples, the temporarily increased current may be an increase of about 10% or 20% relative to the original threshold level.

Figure 8:
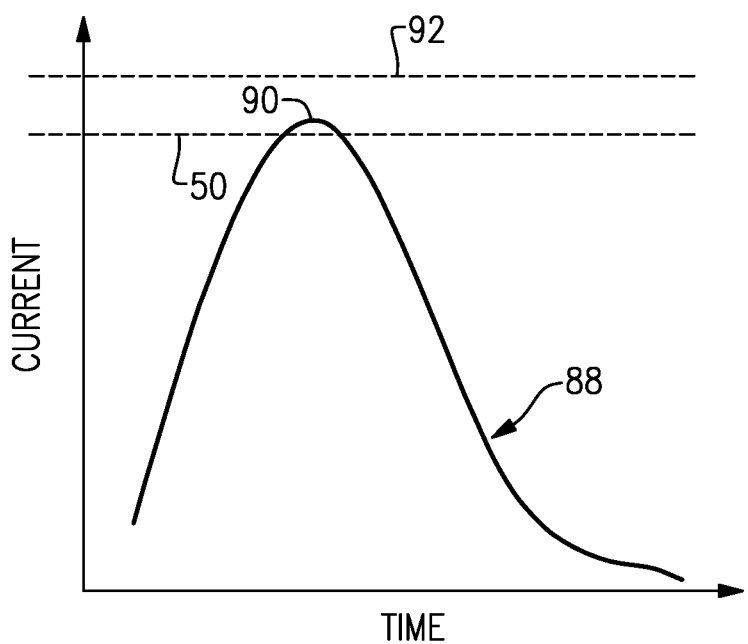
FIG. 8 is a fourth plot of current versus time, and in particular illustrates a level of current exceeding an original threshold level of current, but not exceeding a temporarily increased threshold level of current.

FIG. 8 is another plot of current versus time, including a line 88 representative of the level of current drawn by the motor 28 during an example operation. Line 88 includes a local maximum/turning point 90, which exceeds the original threshold level of current, represented by line 50, but does not exceed the temporarily increased threshold, represented by line 92. Thus, because the user has given a positive input at 84, the operation is permitted to continue, despite the motor 28 drawing current at a level in excess of the original threshold, represented by line 50.

The temporarily increased threshold may remain in place for a predetermined number of cycles (i.e., operations) of the running board assembly to give the user time to clean and/or lubricate the running board before the running board assembly stops working altogether. In one example, the temporarily increased threshold remains in place for 50 cycles, meaning 50 movements of the running board between the deployed position and the retracted position. The temporarily increased threshold could remain in place for another number of cycles, such as 100 cycles or 200 cycles in other examples.

In another aspect of this disclosure, since one possible cause of the increased current drawn by the motor 28 is the accumulation of dirt, ice, or snow, the controller 30 may be configured to initiate a series of sequential movements of the running board 14 between the retracted and deployed positions. The controller 30 may initiate this series of operations under any ambient temperature condition, but in one example the controller 30 initiates the series of movements when the ambient temperature is below a predetermined temperature, such as 35° F. In this way, the running board assembly 12 itself may attempt to remove the conditions which may be causing increased current, saving the user from having to manually perform service on the running board assembly 12.

In a related aspect of the disclosure, the controller 30 may be configured to automatically deploy the running board 14 when the motor vehicle is being cleaned. The motor vehicle 10 may include sensors indicative of the vehicle 10 being in a car wash, and, when the vehicle 10 is in a car wash, the controller 30 may deploy the running board 14, thereby allowing the running board 14 to be cleaned.

Figure 9:
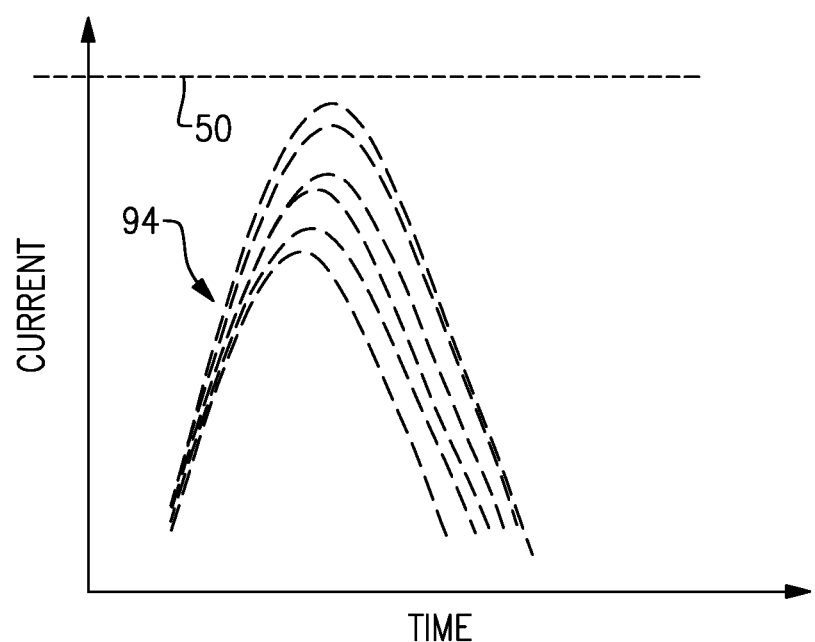
FIG. 9 is a fifth plot of current versus time and is representative of a trend of current levels being tracked over time.

In still another aspect of the disclosure, the controller 30 is configured to track a trend of the level of current drawn by the motor 28 over time. In FIG. 9, for example, a group of dashed lines 94 are representative of the levels of current drawn by the motor 28 over a period of time. Each line may be saved and stored in the memory of the controller 30. The controller 30 may identify trends associated with the levels of current over time as an attempt at identifying deteriorating conditions associated with the running board assembly 12, such as deteriorating lubrication, accumulations of dirt or ice, or a failing linkage, as examples. In this way, when a yes answer (i.e., "Y") to step 60 occurs, the controller 30 may be able to identify whether the increased current was because of a recent upward trend in current, and thus more likely to be caused by a deteriorating condition, or whether the increased current was the result of another external factor, such as an obstruction being in the path of movement P of the running board 14. The controller 30 may send corresponding prompts to the user via the human-machine interface 34 depending on the suspected cause. The controller 30 may also perform the aforementioned series of sequential movements or carwash deployment techniques if the suspected cause of the increased current is a deteriorating condition as opposed to being the result of an obstruction.

It should be understood that terms such as "about," "substantially," and "generally" are not intended to be boundaryless terms, and should be interpreted consistent with the way one skilled in the art would interpret those terms. Further, directional terms such as "below," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
supplying current to a motor to move a running board of a motor vehicle between a retracted position and a deployed position;
monitoring a level of the current; and
permitting the level of current to exceed a threshold in response to a user input;
issuing a prompt to a user when the level of current comes within a predetermined range of the threshold,
wherein the prompt asks the user to determine whether an area adjacent the running board is free of obstructions,
wherein the user is permitted to provide an input indicating whether the area is free of obstructions in response to the prompt, and
wherein the permitting step includes permitting the level of current to exceed the threshold by a predetermined amount in response to the user input indicating that the area is free of obstructions.

2. The method as recited in claim 1, wherein the permitting step includes permitting the level of current to exceed the threshold for a predetermined number of cycles in response to the user input.

3. The method as recited in claim 1, wherein the threshold includes a static current threshold and a moving current threshold.

4. The method as recited in claim 3, wherein the static current threshold is greater than the moving current threshold.

5. The method as recited in claim 1, wherein the threshold is different depending on whether the running board is being retracted or deployed.

6. The method as recited in claim 5, wherein the threshold is lower when the running board is moving to the deployed position than when the running board is moving to the retracted position.

7. The method as recited in claim 1, wherein the threshold is determined based on at least an ambient temperature.

8. The method as recited in claim 1, further comprising:
tracking a trend of the level of current over time, and
issuing a prompt to a user when the trend approaches the threshold.

9. The method as recited in claim 8, further comprising moving the running board to the retracted position when the trend approaches the predetermined range and when it is determined the motor vehicle is being cleaned.

10. A method, comprising:
supplying current to a motor to move a running board of a motor vehicle between a retracted position and a deployed position;
monitoring a level of the current;
permitting the level of current to exceed a threshold in response to a user input, wherein the threshold is determined based on at least an ambient temperature; and
moving the running board between the retracted and deployed positions a series of times when the ambient temperature is below a predetermined temperature and when the level of current is at least within a predetermined range of the threshold.

11. A running board assembly for a motor vehicle, comprising:
a controller;
a motor responsive to instructions from the controller;
a running board moveable between a retracted position and a deployed position by the motor, wherein the controller is configured to permit a level of current drawn by the motor to exceed a threshold in response to a user input indicating an area adjacent the running board is free of obstructions, and wherein the controller is configured to instruct the motor to move the running board between the retracted and deployed positions a series of times when an ambient temperature is below a predetermined temperature and when the level of current is at least within a predetermined range of the threshold.

12. The running board assembly as recited in claim 11, wherein the controller is configured to permit the level of current to exceed the threshold by a predetermined amount in response to the user input.

13. The running board assembly as recited in claim 11, wherein the controller is configured to permit the level of current to exceed the threshold for a predetermined number of cycles in response to the user input.

14. The running board assembly as recited in claim 11, further comprising:
a human-machine interface electrically connected to the controller,
wherein the controller is configured to issue a prompt to a prompt to a user via the human-machine interface when the level of current comes within a predetermined range of the threshold,
wherein the prompt asks the user to determine whether an area adjacent the running board is free of obstructions, and
wherein the user is permitted to provide an input indicating whether the area is free of obstructions in response to the prompt.

15. The running board assembly as recited in claim 11, wherein:
- the threshold includes a static current threshold and a moving current threshold, and
- the static current threshold is greater than the moving current threshold.

16. The running board assembly as recited in claim 11, wherein the threshold varies based on at least one of (1) whether the running board is being retracted or deployed, and (2) an ambient temperature.

\* \* \* \* \*